May 24, 1927. 1,629,797
A. KNITTEL
FILLING STATION VALVE AND KEY
Filed March 10, 1926 3 Sheets-Sheet 1
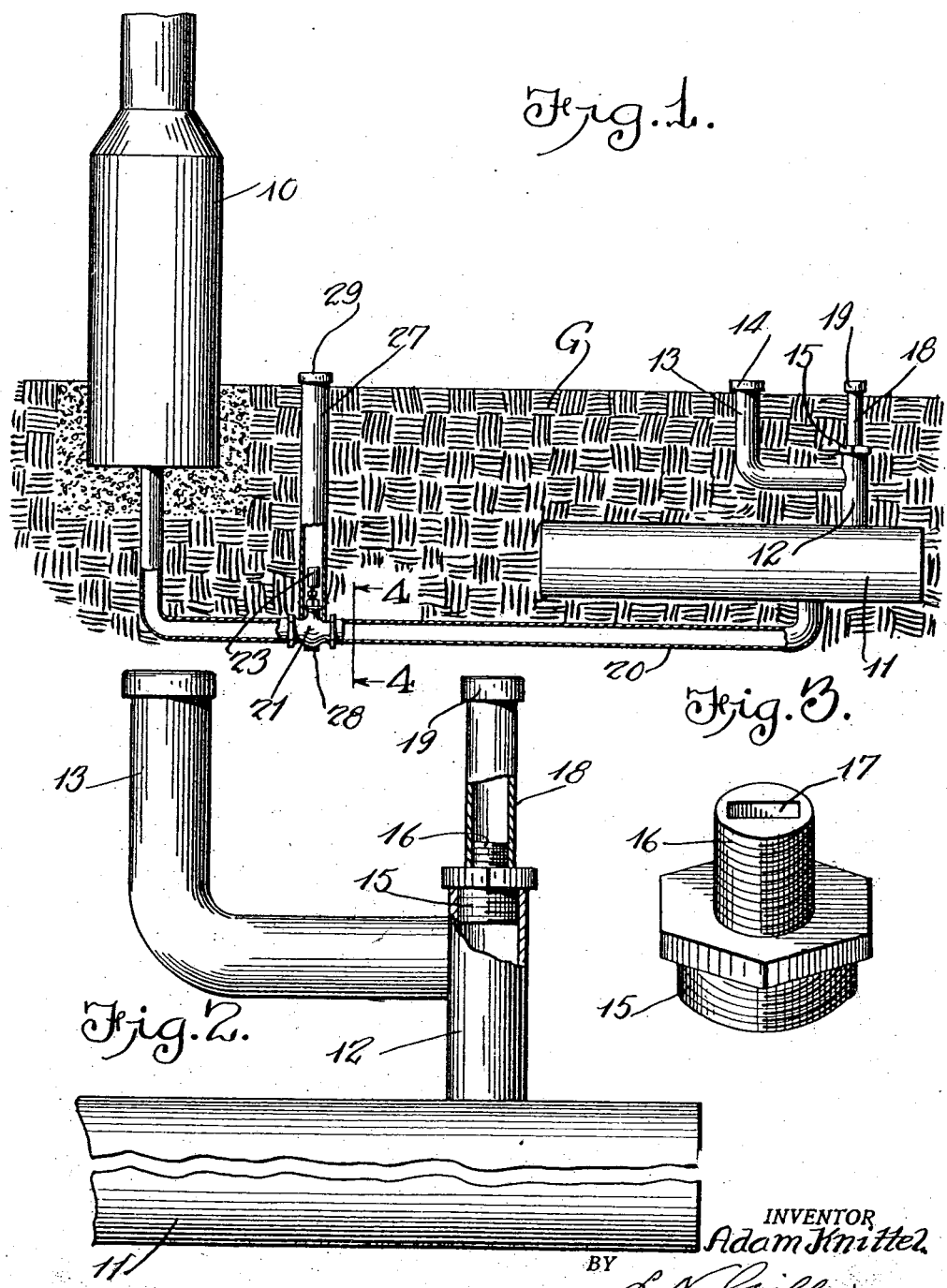

May 24, 1927.

A. KNITTEL 1,629,797

FILLING STATION VALVE AND KEY

Filed March 10, 1926

INVENTOR
*Adam Knittel.*
BY
*L. N. Queller*
ATTORNEY

May 24, 1927.

A. KNITTEL 1,629,797

FILLING STATION VALVE AND KEY

Filed March 10, 1926      3 Sheets-Sheet 3

INVENTOR
Adam Knittel.
BY
L. N. Gillis
ATTORNEY

Patented May 24, 1927.

1,629,797

UNITED STATES PATENT OFFICE.

ADAM KNITTEL, OF TYNER, TENNESSEE.

FILLING-STATION VALVE AND KEY.

Application filed March 10, 1926. Serial No. 93,789.

This invention relates to filling stations for supplying automobiles and other vehicles with gasoline, the station being of the type employing a measuring pump and an underground storage tank having pipe connection to the pump.

More particularly the invention relates to a valve and operating key therefor.

In stations of this class the pipe connection between the tank and pump is usually either valveless or is provided with a valve having an ordinary operating handle easily accessible above the ground. Such constructions lead to ready theft of the gasoline during the absence of the attendant either by automobilists or operators of nearby stations, the latter especially being able to keep watch on the attendant, note his absence and visit the station and remove more or less gasoline unlawfully.

One object of the present invention is to provide an improved arrangement of station of this character wherein the pipe connection between the tank and pump will be provided with an underground valve having its stem equipped with a specially formed head which cannot be turned without the use of a specific cooperating key which is inserted in a pipe or tube leading from the surface of the ground to such valve.

A second object of the invention is to provide an improved form of valve head arrangement so constructed as to permit of a large number of variants whereby only one key form will fit any particular valve stem head to operate the valve.

A third object of the invention is to improve the general arrangement of filling stations of the class described.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a general elevation, partly in section of a filling station constructed in accordance with the invention.

Figure 2 is an enlarged detail showing a portion of the tank and the filling and gauging pipes.

Figure 3 is a detail perspective of the gauge rod guide member.

Figure 9:
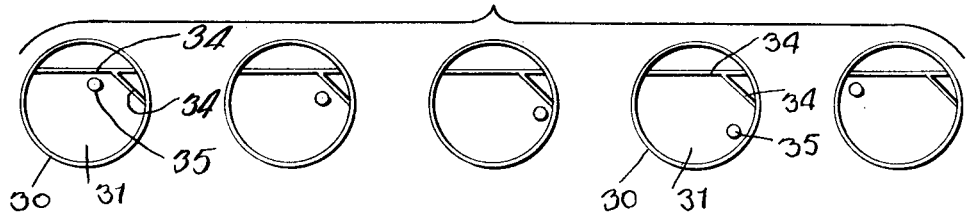
Figure 9 is a group end view of one set of keys of one general type.
Figure 9A:
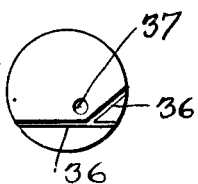
Figure 10:
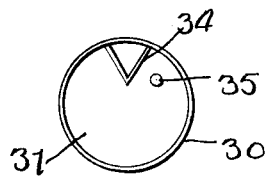

Figure 9ª is an end view of a valve stem head corresponding to the first of the key heads shown in Figure 9.

Figures 10 to 20 are similar end views showing differently modified types of keys, but one key of each set being shown.

In the embodiment of the invention herein shown it will be seen that there is provided a measuring pump 10 here indicated in general outline only since any well known form of pump may be used in connection with this invention and also because the particular construction of such pump forms no part of the present invention.

The ground is indicated at G and buried in the ground is a storage tank 11 which may be of any convenient form or size as is best adapted for the particular filling station. Extending upwardly from a suitable point at the top of the tank is a vertical pipe 12 and from a point in the length of this pipe extends an L-shaped branch pipe 13 having one arm of the L extending up to the surface of the ground, being there provided with a removable cap 14. This pipe 13 and the lower end of the pipe 12 constitute the tank filling pipe. Screwed into the top of the pipe 12 is a coupling member 15 having an upwardly extending threaded boss 16 and extending longitudinally through this member and boss is a rectangular slot of sufficient size to receive and guide a measuring or ullage rod (not shown). Screwed on the boss 16 is a measuring rod guide tube 18 which projects somewhat above the ground and is provided with a removable cap 19.

Figure 4:
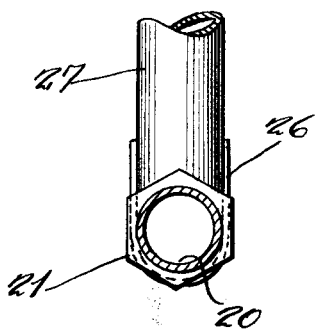
Figure 4 is an enlarged section on the line 4—4 of Figure 1.
Figure 5:
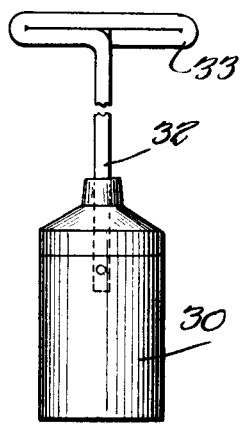
Figure 5 is a side elevation of the valve key used herewith, a portion of the shank being broken out to permit the view being of proper scale.
Figure 6:
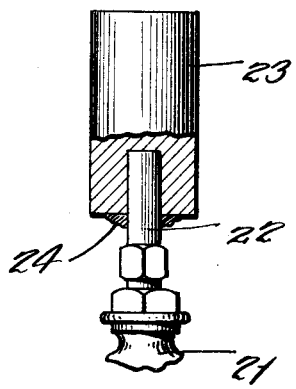
Figure 6 is a side elevation, partly in section showing one form of valve stem head.
Figure 7:
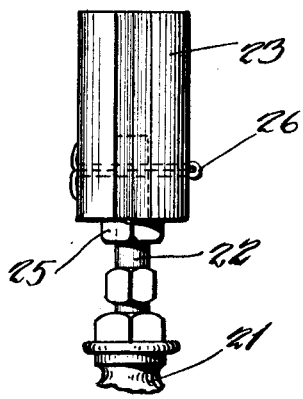
Figure 7 is a side elevation showing a second form of valve stem head.
Figure 8:
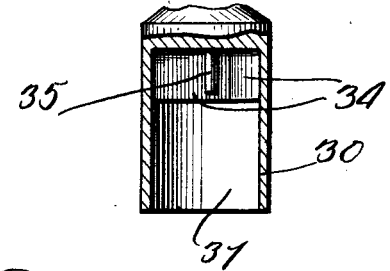
Figure 8 is a section through a portion of one form of key head.

Connecting the tank and pump is a supply pipe 20 and this pipe runs principally underground. At a point in the underground length of this pipe there is provided a control valve 21 which is preferably of the disk type and is provided with a stem 22. On this stem is mounted a cylindrical head 23 which may be secured to the stem by brazing or solder as shown at 24 in Figure 6 or by screwing the head on the stem and there locking it by a lock nut 25 and cotter 26. Leading up from the valve to the surface of the ground is a key tube 27, the tube being held in position on the valve by a strap 28 and having the usual removable cap 29.

The key comprises a cylindrical head portion 30 of such size as to fit freely in the tube 27 and this head is provided with a flat bottomed cylindrical recess 31 in its bottom end, the recess being concentric with the head. From the head extends a shank 32 provided on its upper end with an operating handle 33. The recess 31 is of such diameter as to fit the head 23 snugly and projecting downwardly from the bottom of the recess are one or more blades 34 and a pin 35. These blades coact with correspondingly shaped slots 36 and a recess 37 formed in the head 23.

These keys and the corresponding valve stem heads are arranged in sets, all members of each set having identical arrangement of blades and slots and differing from each other in the positions of the pins as clearly shown in Figure 9.

Figure 11:
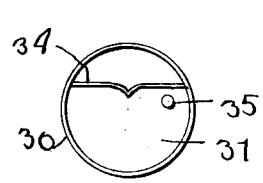
Figure 12:
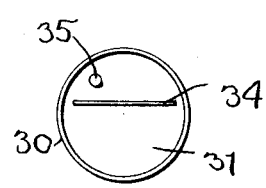
Figure 13:
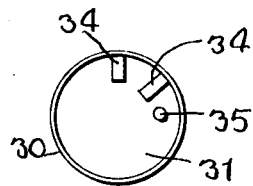
Figure 14:
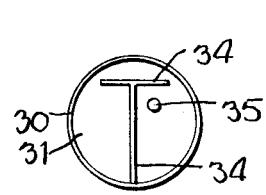
Figure 15:
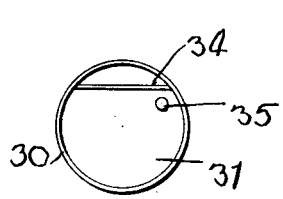
Figure 16:
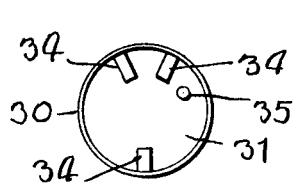
Figure 17:
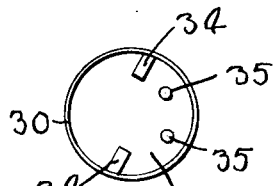
Figure 18:
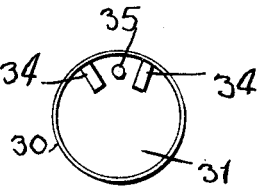
Figure 19:
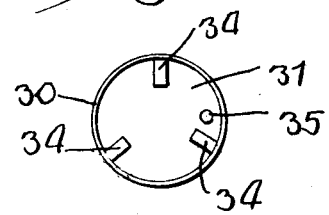
Figure 20:
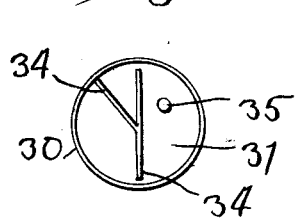

In Figures 10 to 20 are shown various blade arrangements on which a set of keys and valve stem heads may be based and it will be noted that in certain cases the blades are thin and long as in Figure 11 and the like and in other cases the blades are short and thick and arranged at the peripheral wall of the recess as shown in such figures as Figure 16. Also, as in Figure 17, two or more pins may be used. Of course the pin positions for the individual keys for each set will vary, no two in a set being alike.

Thus only the proper key can be used to turn any particular valve and it will be seen that the blade and pin arrangement may be greatly varied so that there may be a wide range to the number of keys and valve stem heads which will cooperate only when the proper key and head are brought together. Thus a given valve can be opened only by a definite key.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In combination, a valve having a rotatable stem, a cylindrical head fixed on said valve stem and provided with a slot and a pin recess, a key having a head provided with a cylindrical recess fitting over said stem head, a blade projecting from the bottom of the key head recess and fitting said slot, and a pin projecting from the bottom of the key head recess and fitting the recess in the stem head.

2. In combination, a valve having a rotatable stem, a cylindrical head fixed on said valve stem and provided with a slot and a pin recess, a key having a head provided with a cylindrical recess fitting over said stem head, a blade projecting from the bottom of the key head recess and fitting said slot, a pin projecting from the bottom of the key head recess and fitting the recess in the stem head, and a guide tube carried by the valve and surrounding the stem and its head, said tube being of a size to receive and guide the key head into position on the stem head.

In testimony whereof I affix my signature.

ADAM KNITTEL.